Dec. 15, 1925.  1,565,944
W. J. KNOLL
CONVEYER
Filed Oct. 31, 1924   2 Sheets-Sheet 1
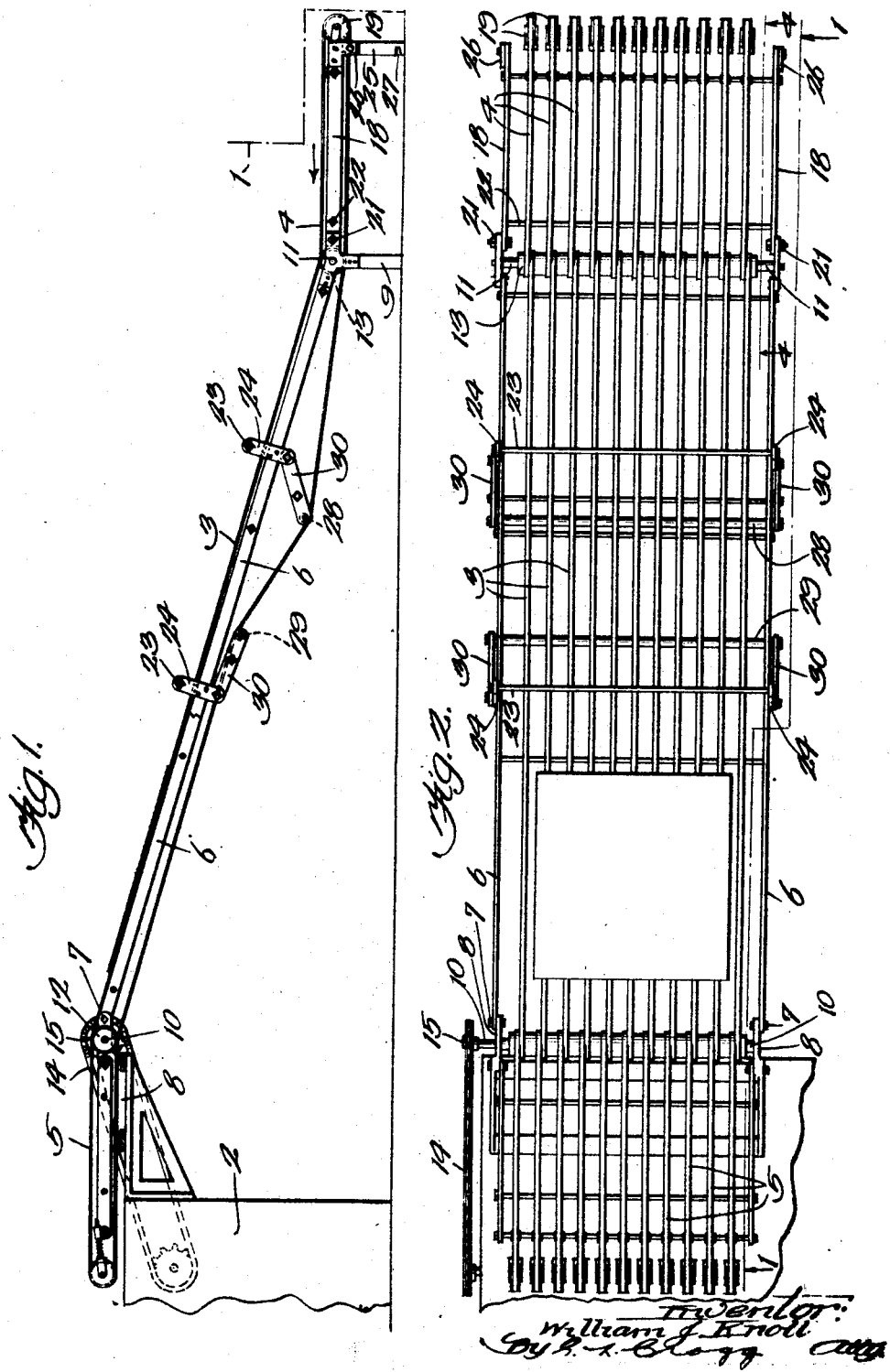

Dec. 15, 1925.
W. J. KNOLL
CONVEYER
Filed Oct. 31, 1924
1,565,944
2 Sheets-Sheet 2
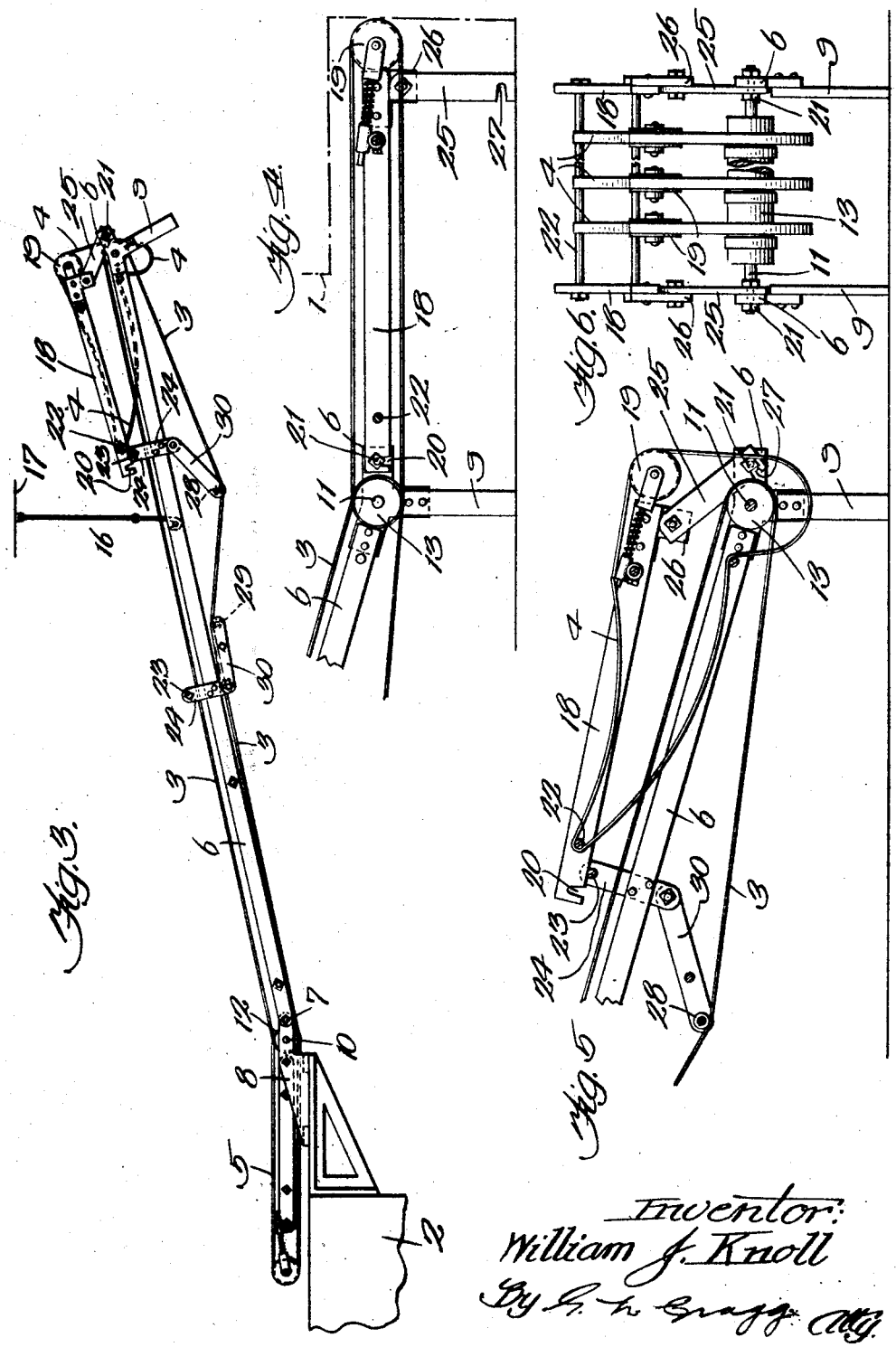
Inventor:
William J. Knoll Patented Dec. 15, 1925.

1,565,944

UNITED STATES PATENT OFFICE.

WILLIAM J. KNOLL, OF CHICAGO, ILLINOIS, ASSIGNOR TO H. B. ROUSE & COMPANY, OF CHICAGO, ILLINOIS, A CORPORATION OF ILLINOIS.

CONVEYER.

Application filed October 31, 1924. Serial No. 747,024.

*To all whom it may concern:*

Be it known that I, WILLIAM J. KNOLL, a citizen of the United States, residing at Chicago, in the county of Cook and the State of Illinois, have invented a certain new and useful Improvement in Conveyers, of which the following is a full, clear, concise, and exact description.

My invention relates to belt conveyers, one feature of the invention residing in improved slack take-up devices.

In accordance with my invention, two take-up devices engage one stretch of an endless belt upon opposite sides thereof, one take-up device pressing this stretch of the belt toward the other belt stretch and the other take-up device pressing the belt stretch engaged by it from the other belt stretch. The belt stretch which is unprovided with the slack take-up device conveys the objects that are to be transferred by the conveyer. The object conveying stretch of the belt is relieved of vibrations by means of the take-up device of my invention. The conveyer of my invention is of particular service in transferring freshly printed sheets from a printing press to a bronzing machine where the freshly printed surfaces are supplied with bronze powder, the conveyer belts being adapted to transfer all of the printed sheets to the bronzing machine in exactly the same location with respect to the bronzing machine.

My invention also relates to a conveyer employing two endless belts, one arranged to deliver objects to the other. I employ a support for such a conveyer, formed in sections placed end to end and which are foldable to enable one section to overlie or be abreast of the other, one section carrying one belt and the other section the other belt. In the preferred embodiment of my invention, one support section is separable from the other at the adjacent ends of the support sections. When the support sections are uncoupled at their adjacent ends, one support section may be drawn over the other together with the particular belt carried thereby. When the support sections are placed abreast, they are desirably held in assembly by means of linkage. This linkage is preferably permanently assembled with the outer end of the separable support section and also serves to constitute a supporting leg structure for the separable support section when the conveyer is adjusted to function.

The invention will be more fully explained in connection with the accompanying drawing in which Fig. 1 is a side view of a conveyer, taken on line 1—1 of Fig. 2, equipped in accordance with my invention, the conveyer being here shown in condition to function; Fig. 2 is a plan view of the conveyer shown in Fig. 1; Fig. 3 is a view illustrating the conveyer in folded adjustment and having one end swung upwardy and suspended to be out of the way; Fig. 4 is an enlarged view of one end of the conveyer on line 4—4 of Fig. 2; Fig. 5 is an enlarged view showing one portion of the conveyer folded over the other as the same appears before the conveyer is swung to the position indicated in Fig. 3; and Fig. 6 is an end view of the conveyer when adjusted as illustrated in Fig. 5.

The conveyer illustrated is shown as being interposed between the press portion 1 of a printing press and a bronzing machine 2, the sheets finding lodgment upon the press portion being individually delivered to the conveyer for transfer to the bronzing machine, the mechanism for feeding the sheets upon and from the conveyer not being illustrated, as such is well understood. The conveyer shown includes one group of endless laterally spaced apart belts 3 and a second group of endless laterally spaced apart belts 4 which deliver printed sheets or other objects to the first belts. A third group of endless belts 5 is illustrated, these latter belts receiving the objects from the belts 3 to further their progress to the destination of such objects. The belts 4 partially underlie the press portion 1, short leading portions of these belts projecting beyond the press portion to receive the sheets individually therefrom. The support for the conveyer is formed in two sections which are respectively individual to the group of belts 3 and the group of belts 4. The support section for the belts 3 is inclusive of the side rails 6 pivoted at 7 to the brackets 8, these side rails sloping downwardly from the brackets when the conveyer is adjusted to function. The other, and normally lower, ends of the rails 6 have angular downwardly extending continuations 9 to act as supporting legs for the rails 6 when these rails are downwardly inclined from the brackets 8. The support section for the belts 3 includes the transverse shafts 10 and 11, carrying the rollers 12 and 13 located at the ends of travel of the belts 3 and over which these belts pass. The rollers 12 and 13 may be fixed upon their respective shafts 10 and 11 in which event these shafts are journaled in the side rail 6. The belts are positively driven as by means of the driving sprocket chain 14 passing over the sprocket wheel 15 fixed upon one end of the shaft 10. The belts 4 partially underlie the press portion when the conveyer is adjusted to function. When the conveyer is not to function, it is contracted in length and is swung upwardly, as indicated in Fig. 3, the conveyer being held in this position by means of a hook support 16 depending from the ceiling or other upper support 17. The support section for the belts 4 includes the side rails 18 upon which the individually rearwardly pressed sheaves 19 are carried for supporting the belts 4 at the outer end of the rails 18, the belts 4 being supported at their other ends of travel by being passed about the roller 13 about which the belts 3 also pass. The inner ends of the rails 18 are notched upon their lower sides as indicated at 20. The side rails 6 are continued to overlap the side rails 18 and carry bolts 21 that are received in the notches 20 when the two sections of the conveyer support are related to enable the conveyer to function. When the conveyer is to be contracted in length, the side rails 18 are lifted at their inner ends, after the nuts upon the bolts 21 have been loosened, whereafter the side rails 18 are drawn forwardly to overlie or be abreast of the side rails 6 as indicated in Figs. 3 and 5. The belts 4 which are alternated with the belts 3 are then caught by the spanner rod 22 which connects the side rails 18 near the notches 20 so that the belts 4 are also placed abreast of the belts 3 when the side rails 18 are moved as described. The inner or notched ends of the side rails 18 are held spaced apart from the belts 3 and the side rails 6, when the support sections of the conveyer are in the folded relation illustrated in Figs. 3 and 5, by means of the spanner rod 23 carried upon the brackets 24 which are provided upon the side rails 6. The rear or outer end of the support section for the belts 4 is desirably supported upon foldable legs 25 which are pivotally connected with the brackets 26 that depend from the side rails 18. These legs are provided with notches 27 at their lower ends which are receivable upon the shanks of the bolts 21, between the bolt nuts and the side rail 6, when the conveyer belts 4 and their support section are placed abreast of the conveyer belts 3 and their support section, as illustrated in Figs. 3 and 5, the legs 25 then serving as links which assemble the outer end of the support section for the belts 4 with the adjacent end of the support section for the belts 3 when the support is in its folded adjustment. After the folded adjustment of the conveyer has been effected, as illustrated in Fig. 5, the press portion 1 has been sufficiently cleared to enable the conveyer to be swung upwardly and suspended, as indicated in Fig. 3.

The belts 4 are so short that they may be maintained under desired tension by means of the rearwardly spring pressed sheaves 19. The belts 3 are, however, usually quite long so that the sheet supporting upper stretches thereof would be liable to tremble or vibrate, were it not for the slack take-up device of my invention so that the sheets would have their positions changed upon the belts 3 and would not be delivered in proper register to the bronzing or other machine or place. The slack take-up means illustrated includes a roller 28 engaging the top sides of the lower stretches of the belts 3 to press these stretches downwardly away from the top stretches of these belts and a roller 29 engaging the under sides of these lower belt stretches to press the same upwardly toward the top stretches of these belts, the rollers 28 and 29 imparting zigzag shape to the lower stretches of the belts 3 thereby to make the upper stretches of these belts properly taut. The rollers 28 and 29 are carried by the side rails 6 through the intermediation of brackets 30 which are rigidly secured to the side rails.

Changes may be made without departing from my invention.

Having thus described my invention, I claim:—

1. A conveyer including two endless belts, one arranged to deliver objects to the other, in combination with a support formed in sections placed end to end, one section carrying one belt and the other section the other belt, one of said support sections being separable from the other at their adjacent ends to enable one section to overlie the other; and linkage for assembling the outer end of the separable support section with the other support section, said linkage also constituting a supporting leg structure for the outer end of the separable support section when the conveyer is adjusted to function.

2. A conveyer including two endless belts, one arranged to deliver objects to the other, in combination with a support formed in sections placed end to end, one section carrying one belt and the other section the other belt, one of said support sections being separable from the other at their adjacent ends to enable one section to overlie the other; and linkage for assembling the outer end of the separable support section with the other support section which has link engaging means at its end that is adjacent the separable support section, said linkage also constituting a supporting leg structure for the outer end of the separable support section when the conveyer is adjusted to function.

3. A conveyer including two endless belts, one arranged to deliver objects to the other, in combination with a support formed in sections placed end to end, one section carrying one belt and the other section the other belt, one of said support sections being separable from the other at their adjacent ends to enable one section to overlie the other; linkage for assembling the outer end of the separable support section with the other support section, said linkage also constituting a supporting leg structure for the outer end of the separable support section when the conveyor is adjusted to function; and common means for assembling either said linkage or the inner end of the separable support section with the other support section.

4. A conveyor including two endless belts, one arranged to deliver objects to the other, in combination with a support formed in sections placed end to end, one section carrying one belt and the other section the other belt, one of said support sections being separable from the other at their adjacent ends to enable one section to overlie the other; linkage for assembling the outer end of the separable support section with the other support section which has link engaging means at its end that is adjacent the separable support section, said linkage also constituting a supporting leg structure for the outer end of the separable support section when the conveyer is adjusted to function; and common means for assembling either said linkage or the inner end of the separable support section with the other support section.

5. A conveyer including two endless belts, one arranged to deliver objects to the other, in combination with a support formed in sections placed end to end, one section carrying one belt and the other section the other belt, one of said support sections being separable from the other at their adjacent ends to enable one section to overlie the other; and linkage for assembling the separable support section with the other support section, said linkage also constituting a supporting leg structure for the separable support section when the conveyer is adjusted to function.

6. A conveyer including two endless belts, one arranged to deliver objects to the other, in combination with a support formed in sections placed end to end, one section carrying one belt and the other section the other belt, one of said support sections being separable from the other at their adjacent ends to enable one section to overlie the other; and linkage for assembling the outer end of the separable support section with the other support section, said linkage being connectible between one of the adjacent ends of said sections and the remoter end of the other section.

7. A conveyer including two endless belts, one arranged to deliver objects to the other, in combination with a support formed in sections placed end to end, one section carrying one belt and the other section the other belt, one of said support sections being separable from the other at their adjacent ends to enable one section to overlie the other; and linkage for assembling said sections when one overlies the other, this linkage being separably connected with one of said support sections.

8. A conveyer including two endless belts, one arranged to deliver objects to the other, in combination with a support formed in sections placed end to end, one section carrying one belt and the other section the other belt, one of said support sections being separable from the other at their adjacent ends to enable one section to overlie the other; and linkage for assembling said sections when one overlies the other, this linkage being separably connected with one of said support sections, and constituting a supporting leg structure for the other section when the conveyer is adjusted to function.

In witness whereof, I hereunto subscribe my name.

WILLIAM J. KNOLL.